June 9, 1964  J. A. CARR  3,136,400
TORQUE RESPONSIVE CLUTCH FOR MARINE PROPELLER
Filed March 3, 1961
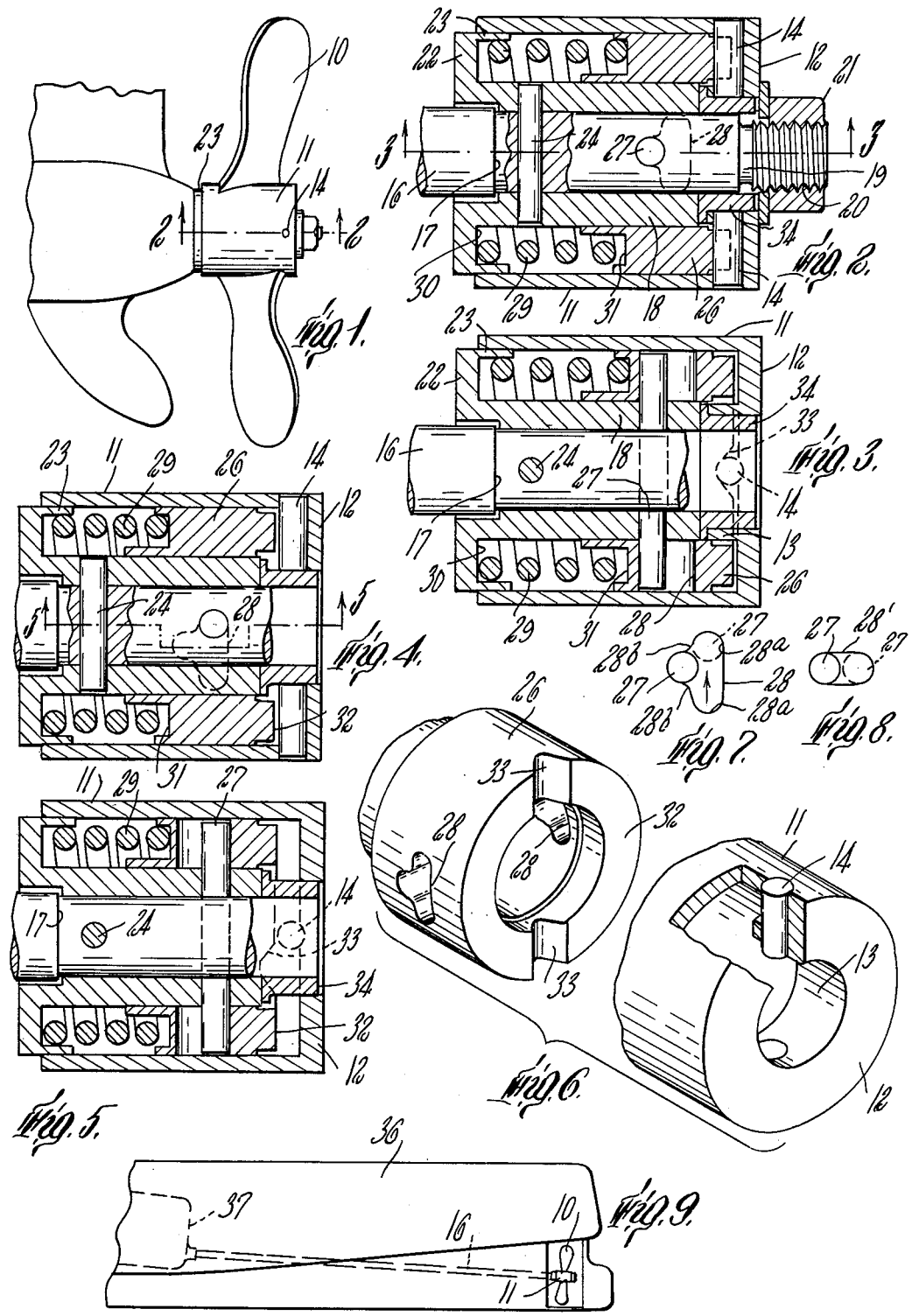

3,136,400
TORQUE RESPONSIVE CLUTCH FOR
MARINE PROPELLER
Joseph A. Carr, 52 Cranmore Lane, Melrose 76, Mass.
Filed Mar. 3, 1961, Ser. No. 93,061
2 Claims. (Cl. 192—56)

My invention concerns torque controlled drives for marine propellers and is designed to provide a mechanism to release the propeller from its connection to the driving shaft when rotation of the propeller is obstructed or opposed by a countervailing torque and to restore the driving connection and rotation of the propeller automatically when the obstruction or opposing torque is removed. A principal object of my invention is to provide a releasable clutch in the drive which will function reliably and will not jam whether the motion of the boat is in forward or reverse direction when an obstruction is encountered by the propeller.

Another object is to provide a dependable and rugged structure which will not easily wear out but will maintain a uniform torque value at which it will operate repeatedly over a relatively long life.

A further object is to provide a releasable drive having but few parts, inexpensive and readily fabricated and assembled.

Still another object is to provide a releasable clutch drive which will hold itself in disengaged position until the propeller obstruction is entirely cleared and then will automatically re-engage.

Many of the objects of this invention are obtained by mounting all of the moving parts of the clutch or disengaging mechanism entirely within the hub of the propeller itself. Furthermore, the hub is so mounted and connected with relation to the other parts that it does not have to move and is not permitted to move longitudinally of the propeller shaft in order for the torque clutch to function.

Still further objects and advantages and details of preferred forms of my invention are described in the following specification and the accompanying drawing forming a part thereof in which:

FIG. 1 is a fragmentary side elevation view of the lower end of an outboard motor gear housing showing how the clutch of this invention may be incorporated in the hub of the propeller thereof, FIG. 2 is an enlarged sectional view of the hub on the line and in the direction of the arrows 2—2 of FIG. 1, showing elements of the clutch in driving condition, FIG. 3 is a sectional view on the line and in the direction of the arrows 3—3 of FIG. 2, FIG. 4 is a sectional view like FIG. 2 but showing the parts as they will appear in disengaged or non-driving condition, FIG. 5 is a view similar to FIG. 3, but on the line and direction of the arrows 5—5 of FIG. 4, showing the clutch disengaged, FIG. 6 is an exploded fragmentary and cut away perspective view in which some details of the two of the principal clutch elements are shown, FIG. 7 is a schematic plan view of the clutch guiding slot of a preferred form, FIG. 8 is a similar view of another form of clutch guiding slot and, FIG. 9 is a side elevation view of the stern of a boat with a motor mounted inboard, illustrating how the invention may be applied to the propeller for this type of craft.

The propeller 10 may be made of bronze or other suitable material, machined or otherwise formed at its hub into a cup shape, that is with a hollow hub body 11 open at one end and having an annular wall 12 partially closing the other end, the center hole of the annulus being provided with a central circumferential inturned flange 13. Bridging the space between the flange and the outer walls next to the inside of the annular end wall are fixed two diametrically opposed drive pins 14 preferably made of hard stainless steel, mounted in suitable holes provided for that purpose. Instead of the pins, projecting surfaces or teeth formed integrally with the inner walls of the hub body may be used, provided that these teeth be capable of hardening to the desired degree for the performance expected of them.

Driving the propeller is a shaft 16 of cylindrical form with a step or shoulder 17 thereon for seating the main driving element 18 of the propeller. At the free end of the shaft a reduced diameter section 19 is provided with a threaded surface 20 to receive a nut 21 with appropriate washer which holds the entire hub assembly on the shaft. The nut may of course be provided with a suitable locking arrangement or fastening device such as a lock washer or a cotter pin to prevent its accidental loosening or removal. Also, if desired, a streamlined cap or fairing may be mounted over the nut and shaft end.

The main driving element 18 closes the open end of the hub body 11 by an outwardly extending annular end wall 22 integral with the element 18 and a circumferential inturned flange 23 fitting within the end of the hub. However, the driving element end wall flange 23 and hub body are free to rotate with respect to each other. The outer end of the driving element is stepped to receive the stepped portion 17 of the shaft and closely fits the shaft, being secured thereto against rotational movement by a cross pin or pins 24, or in some other conventional fashion as by a key-way with appropriate key or splines. Thus this driving element may be regarded as stationary with respect to the shaft, in effect, part of the shaft itself, and it turns when the shaft turns. The preferred material for the main driving element is stainless steel of marine grade.

The moving clutch element or collar 26, also made preferably of stainless steel, is slidably mounted on the main driving element, but its sliding movement is limited in both longitudinal and circumferential extent by a stop pin 27 passing through the main driving element and preferably through the shaft. This stop pin 27 rides within a longitudinally extending clutch guiding slot 28 in the clutch collar, thereby limiting its movement in the manner explained later. For a balanced design the stop pin 27 is extended or duplicated on both sides of the shaft and a corresponding slot is provided for each pin end. A single pin extending to one side only might be used if preferred.

A compression spring 29 extends between a channel 30 inside the annular end wall of the driving element and a similar channel 31 in the facing end wall of the clutch collar, the channels serving as seats for the ends of the spring 29. This spring presses the clutch element in a direction toward the annular end wall of the propeller hub, and the clutch cam face 32 with radially disposed opposed V-notches or dwells 33 therein is thus biased toward and moved close to the inside of the end wall of the hub body to cooperate with the drive pins 14 therein.

It is at present preferred that the guiding slot 28 be provided with circumferentially directed extensions 28a and rounded retarding or locking shoulders 28b. This form of slot, roughly triangular or T-shape, has a peculiar action when the clutch is forced to disengaged position. While the propeller is free and the clutch is engaged, the pin 27 will ride in the central part of the slot, as indicated in FIG. 7 in solid lines, the clutch being biased toward that position by the spring 29. Direction of rotation of the shaft is shown by the arrow in FIG. 7. When the propeller is obstructed, the drive pins 14 on the hub will ride up out of the dwells 33 on the clutch and slide the clutch on the shaft, against opposition of the spring 29. Momentarily the rotation of the clutch itself will be retarded, and while the clutch slides longitudinally it will also move slightly circumferentially, the stop pin 27 sliding over the retarding shoulder 28b and into one of the extensions 28a of the slot, the position shown in dotted lines in FIG. 7. This will lock the clutch in open position and it will not seek to go back into engaged or driving position until the propeller is cleared and the pressure of the spring 29 is great enough to overcome the inertia of the clutch parts. At this time, the clutch will be moved a small distance in a direction the same as the direction of rotation of the shaft, the retarding shoulder 28b will ride over the pin 27 and the pin will again occupy the driving position shown in solid lines in FIG. 7. The opposite circumferential extension 28a in the slot is provided so that the same action will take place if the propeller is being driven in the opposite direction.

FIG. 8 shows a simpler form of guiding slot 28′, with the pin 27 in solid lines in the position it will occupy when the clutch is engaged and the propeller is being driven. Dotted lines shown where the pin is located in the slot when the clutch is disengaged. After the hub is obstructed, each time the shaft rotates so that one of the cam dwells passes one of the drive pins, the spring will resiliently urge the clutch to seek a seat on and drive the hub. If the hub is still being held or obstructed, the seating will not take place and the shaft will continue to rotate without rotating the hub. This will cause a noise, warning the operator that something is amiss. The operator can then stop the motor and clear the obstruction.

However, the slot shown in FIG. 7, although it provides a lock-out feature for the clutch, also will warn the operator because, the load on the drive shaft being released, the motor will tend to race until it is slowed down sufficiently or stopped so that automatic clutch re-engagement can take place after freeing the propeller.

A flanged bearing bushing 34 is freely fitted on the shaft between the shaft, the end edge of the driving element, and the central inturned flange of the hub, to insure that rotation of the shaft does not necessarily cause rotation of the hub. The nut and washer on the end of the shaft also hold the hub body against longitudinal movement on the shaft, but are neither designed nor intended to be tightened sufficiently to prevent relative rotation between the hub and the shaft.

FIG. 9 shows a boat 36 with a motor 37 mounted inboard and a drive shaft 16′ leading therefrom to the stern. A propeller 10, having a hub body 11 identical with the one previously described is provided to drive the craft. The same functions will be performed as in the case of the outboard motor propeller.

Under normal conditions rotation of the shaft and the driving elements fixed thereto will cause corresponding rotation of the hub and of the propeller on it as explained above. The driving connections are from the shaft and driving element 18 through the stop pin 27, the slot 28 in the clutch collar, from the cam face 32 through the dwells 33 to the drive pins 14 on the hub. As long as no sufficiently large force opposes or obstructs the rotation of the propeller hub, this driving couple will be maintained and the propeller will be driven. However, if the propeller should hit a large object or if the hub should become snagged in some fashion so as to resist rotation, the drive pins 14 will in effect become stationary. When this happens, further rotation of the clutch collar will force the cam notches off the drive pins, at the same time shifting the clutch piece on the shaft axially inwardly against pressure of the spring. The stop pin 27 will change its location from the part of the slot where it has been during driving, and will be guided into the other part of the slot as the clutch collar moves. It will thus be seen that there is no longer any effective driving connection between the shaft and the hub, because this depended upon the engagement of the drive pins in the notches of the clutch cam face.

As soon as the hub is freed sufficiently so that the spring can again force the notches to seat over the drive pins during some rotational cycle of the shaft, the driving connection will be re-established automatically and the propeller will again function. In both forms shown, the guide slot for the stop pin is made so that the clutch will function no matter in which direction the shaft is rotating. The device will therefore work whether the shaft is in forward drive or reverse.

Although the forms so far described imply that the propeller blades 10 are mounted directly outside of the hollow body 11 so that this element is literally the hub of the propeller, obviously the hollow body need not itself carry the propeller blades but these may be part of a standard propeller and hub unit mounted so as to be rotatable with respect to the propeller shaft and firmly secured to one end or the other of the cup shaped body 11, in effect being an extension of that hollow body. Also, obviously, the releasable clutch mechanism of this invention might be located in the propeller drive shaft itself, before it reaches the propeller proper. In such case the clutch collar 26 would then be mounted near the end of one section of the propeller shaft, to be driven thereby, and the cup shaped body 11 would be aligned with and enclose the collar but be secured to a separate shaft section which would be virtually an extension of the true propeller hub.

In any case, the fact that the hub or hollow body is fixed against longitudinal movement on the shaft insures action of the clutch whether the craft is in forward or reverse movement and an obstruction is encountered fore or aft the propeller. The only part of the assembly which must move in one longitudinal direction or another in order to couple or uncouple the drive is the clutch itself, which is housed entirely within the hub or hollow body and therefore is protected against interference in its action.

Having thus described preferred forms of my invention what I claim is:

1. A marine propeller clutch mechanism of the character described comprising a rotatably driven shaft, a sleeve having a radially extending unitary flange surrounding said shaft and fixed against longitudinal movement thereon, a clutch collar surrounding said sleeve and rotatable and slideable thereon, said collar having a generally T-shaped guiding slot therein, the central leg of the slot extending parallel to the axis of the shaft and the cross-bar of the slot extending along the circumference of the collar, rounded shoulders connecting the central leg to the sides of the cross-bar portion, a stop pin fixed to said shaft, extending radially therefrom into slideable guiding engagement with said slot, a cup-like hub body surrounding and enclosing said collar and shaft, fixed axially but rotatable with respect to said shaft, camming clutch formations in said hub body, matching cam dwells on said clutch collar, said flange having a portion thereof extending within the cup-like hub body to close the same but rotatable with respect to it, compressible spring means within said hub body extending between said flange and said collar and biasing said collar axially of said shaft and the cam dwells on the collar toward driving engagement with the clutch formations in the hub, said spring means also biasing the collar so that the pin on the shaft lies in the base of the central leg of the slot in the collar when the collar cam dwells and matching hub formations are in driving engagement, whereby, when rotation of said hub is obstructed, said hub camming formations ride out of the cam dwells on the clutch collar, sliding the collar axially against the spring bias so that driving engagement with the hub is broken and the stop pin rides over one of said shoulders into a cross-bar portion in the guiding slot, thereby to lock said clutch collar against immediate return to driving engagement.

2. In combination with a longitudinally extending rotatable marine propeller shaft, a clutch collar slideably surrounding said shaft, said collar having a generally T-shaped guiding slot therein with the central leg of the slot extending longitudinally of the shaft and the cross-bar of the T extending circumferentially, a stop pin fixed to said shaft extending radially therefrom into said collar guiding slot, a generally cylindrical hollow propeller hub body with one closed end and one open end, said hub entirely surrounding and enclosing said clutch collar and being fixed longitudinally but movable rotatably with respect to said shaft, a pair of diametrically opposed radially extending drive pins fixed in said hub body adjacent its closed end, said clutch collar having a cam face thereon with V-notches adapted removably to engage said drive pins, a radially extending annular flange fixed to said shaft having an axial extending sleeve portion at its radial extremity extending into and closing the open end of the hub and a single spring entirely within said hub body extending from said flange to said clutch collar, resiliently biasing said collar longitudinally of said shaft and the V-notches on the clutch collar toward engagement with the drive pins in the hub.

References Cited in the file of this patent

UNITED STATES PATENTS

| | | |
|---|---|---|
| 1,119,938 | Dustin et al. | Dec. 8, 1914 |
| 1,214,680 | Hochriem | Feb. 6, 1917 |
| 1,648,996 | Reibel | Nov. 15, 1927 |
| 1,975,827 | Cone | Oct. 9, 1934 |
| 1,999,523 | Willoughby | Apr. 30, 1935 |